(12) United States Patent
Mamiya

(10) Patent No.: US 7,304,322 B2
(45) Date of Patent: Dec. 4, 2007

(54) IMAGE READING APPARATUS

(75) Inventor: Akifumi Mamiya, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

(21) Appl. No.: 11/074,705

(22) Filed: Mar. 9, 2005

(65) Prior Publication Data

US 2005/0205812 A1    Sep. 22, 2005

(30) Foreign Application Priority Data

Mar. 22, 2004  (JP) .............................. 2004-082809

(51) Int. Cl.
 *G01N 23/04* (2006.01)
 *G03B 42/08* (2006.01)
(52) U.S. Cl. ........................ 250/585; 250/584; 250/588
(58) Field of Classification Search ................ 250/584, 250/588, 585
 See application file for complete search history.

(56) References Cited

U.S. PATENT DOCUMENTS

| | | | | |
|---|---|---|---|---|
| 4,900,926 A | * | 2/1990 | Yoshimura et al. | ......... 250/589 |
| 4,904,868 A | * | 2/1990 | Kohda et al. | ................. 250/584 |
| 4,960,994 A | * | 10/1990 | Muller et al. | ................. 250/584 |
| 5,280,155 A | * | 1/1994 | Ohtsuka et al. | ............. 219/216 |
| 5,325,144 A | * | 6/1994 | Yoshikawa et al. | ......... 396/612 |
| 5,379,058 A | | 1/1995 | Obu et al. | |
| 5,432,354 A | * | 7/1995 | Ohara | ......................... 250/582 |
| 5,661,310 A | * | 8/1997 | Jones | ......................... 250/584 |
| 5,944,306 A | * | 8/1999 | Maeda et al. | ................ 271/145 |
| 6,861,661 B1 | * | 3/2005 | Nakajima et al. | ........... 250/584 |

FOREIGN PATENT DOCUMENTS

| JP | 5-262012 A | 10/1993 |
|---|---|---|
| JP | 2003-287866 A | 10/2003 |

* cited by examiner

*Primary Examiner*—David Porta
*Assistant Examiner*—Carolyn Igyarto
(74) *Attorney, Agent, or Firm*—Sughrue Mion, PLLC

(57) ABSTRACT

An image reading apparatus includes a casing accommodating therein a heating mechanism for heating the interior of the casing. The heating mechanism has a heating body mounted on a guide plate along which a stimulable phosphor sheet is fed. When supplied with electric current, the heating body is heated to heat the guide plate to a predetermined temperature. An air blower is disposed in confronting relation to the heating body and is energized to circulate heated air inside the casing. A temperature detector detects the atmospheric temperature inside the casing, and when the detected atmospheric temperature becomes higher than a reference temperature preset in a controller, the controller stops supplying electric current to the heating body.

14 Claims, 7 Drawing Sheets

IMAGE READING APPARATUS

BACKGROUND OF THE INVENTION

1. Field of the Invention

The present invention relates to an image reading apparatus for reading radiation image information recorded on a stimulable phosphor sheet stored in a cassette, and thereafter erasing remaining radiation image information from the stimulable phosphor sheet.

2. Description of the Related Art

There has heretofore been known a stimulable phosphor which, when exposed to applied radiation (X-rays, α-rays, β-rays, γ-rays, electron beams, ultraviolet radiation, or the like), stores part of the energy of the radiation, and, when subsequently exposed to applied stimulating rays such as visible light, emits light in proportion to the stored energy of the radiation. An image forming apparatus, which is known in the art, records radiation image information of a subject such as a human body on a stimulable phosphor sheet having a stimulable phosphor layer formed thereon.

An image reading apparatus has a cassette loader for loading therein a cassette holding a stimulable phosphor sheet, which has radiation image information of a subject such as a human body recorded thereon, a reader for applying stimulating light to the stimulable phosphor sheet to read the recorded radiation image information from the stimulable phosphor sheet, and an eraser for applying erasing light to the stimulable phosphor sheet after the recorded radiation image information has been read, thereby erasing any remaining radiation image information from the stimulable phosphor sheet. After the remaining radiation image information has been erased from the stimulable phosphor sheet, the stimulable phosphor sheet is returned into the cassette and unloaded from the image reading apparatus for reuse.

The stimulable phosphor sheet used in the image reading apparatus may develop a curl at its leading end, due to certain temperatures at which it is used, e.g., at low temperatures during winter and in cold climates. If the stimulable phosphor sheet is curled at its leading end, then the curled end cannot enter smoothly between feed rollers while the stimulable phosphor sheet is being transported through the image reading apparatus, resulting in a failure to efficiently read the recorded radiation image information from the stimulable phosphor sheet in the image reading apparatus.

For using the image reading apparatus in environments having low temperatures, such as during the winter and in cold climates, the room in which the image reading apparatus is installed needs to be heated quickly by a heater. When the room is heated, moisture condensation may occur in the image reading apparatus, due to a temperature difference that is abruptly caused between the temperature in the room and the temperature within the image reading apparatus.

Japanese Laid-Open Patent Publication No. 05-262012 discloses a recording apparatus with a heating mechanism for heating a thermosensitive recording medium to a predetermined temperature. The recording apparatus has a first heater, a cooler, and a second heater, which are disposed along a feed path for feeding the thermosensitive recording medium. The thermosensitive recording medium is heated to a predetermined temperature by the first heater and then cooled by the cooler. Thereafter, the thermosensitive recording medium is heated to a predetermined temperature by the second heater for writing information thereon.

In Japanese Laid-Open Patent Publication No. 2003-287866, the applicant of the present application has proposed a drying apparatus for drying an image recording medium for use in a printer processor. The drying apparatus has a plurality of nozzles disposed over a feed path for feeding the image recording medium and held in communication with an air duct. Drying air, which is heated by a heater disposed in the air duct, is delivered through the air duct by an air blower, and applied through the nozzles to the image recording medium, thereby drying an image recording medium that has been washed with water.

The recording apparatus disclosed in Japanese Laid-Open Patent Publication No. 05-262012 serves to achieve a stable printing quality by heating the thermosensitive recording medium before writing information thereon. The drying apparatus proposed in Japanese Laid-Open Patent Publication No. 2003-287866 serves to apply drying air to dry the image recording medium, which becomes wet after it is washed with water. Therefore, these apparatus belong to a different technical field, which differs from the art of heating an image reading apparatus used in low temperature environments.

The apparatus disclosed in Japanese Laid-Open Patent Publication No. 05-262012 and Japanese Laid-Open Patent Publication No. 2003-287866 are unable to prevent moisture condensation due to a rapid temperature rise caused by heating when the image reading apparatus is used at low temperatures during winter and in cold climates, and such apparatus are also unable to eliminate curling that may possibly occur at the end of a stimulable phosphor sheet that is fed into the image reading apparatus.

According to one solution, a dehumidifier, for example, may be incorporated in the image reading apparatus, for removing moisture condensation from the image reading apparatus. However, this solution is disadvantageous in that the image reading apparatus is increased in size due to the dehumidifier.

When the leading end of the stimulable phosphor sheet becomes curled, then the curled end prevents the stimulable phosphor sheet from entering smoothly between the feed rollers as it travels through the image reading apparatus. As a result, the recorded radiation image information cannot be read efficiently from the stimulable phosphor sheet by the image reading apparatus.

SUMMARY OF THE INVENTION

It is a general object of the present invention to provide an image reading apparatus that includes a mechanism for heating the interior of the image reading apparatus, to prevent moisture condensation in the image reading apparatus, and to allow a stimulable phosphor sheet to be fed smoothly and reliably through the image reading apparatus.

According to the present invention, a heating mechanism is disposed in a casing of an image reading apparatus for heating the interior of the apparatus casing to a predetermined temperature. When the image reading apparatus is used in low temperature environments, during winter and in cold climates, the interior of the casing is heated beforehand to a predetermined temperature by the heating mechanism. Therefore, even if the temperature outside of the image reading apparatus is quickly increased, a temperature difference is prevented from being abruptly caused between the temperature outside of the image reading apparatus and the temperature inside the casing.

Consequently, moisture condensation is prevented from occurring in the casing even when the temperature outside of the image reading apparatus is increased, and there is no need to provide a dehumidifier or the like inside the casing for removing moisture condensation. Therefore, the image reading apparatus can be reduced in size and the installation space for installing the image reading apparatus therein can be reduced.

Since the interior of the casing is heated by the heating mechanism, when a stimulable phosphor sheet is introduced into the casing that has a curl at an end thereof due to low temperatures, the curl is eliminated from the stimulable phosphor sheet inside the heated casing. Consequently, the stimulable phosphor sheet can smoothly and reliably be fed in an auxiliary scanning direction inside the image reading apparatus by an auxiliary scanning feed mechanism.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
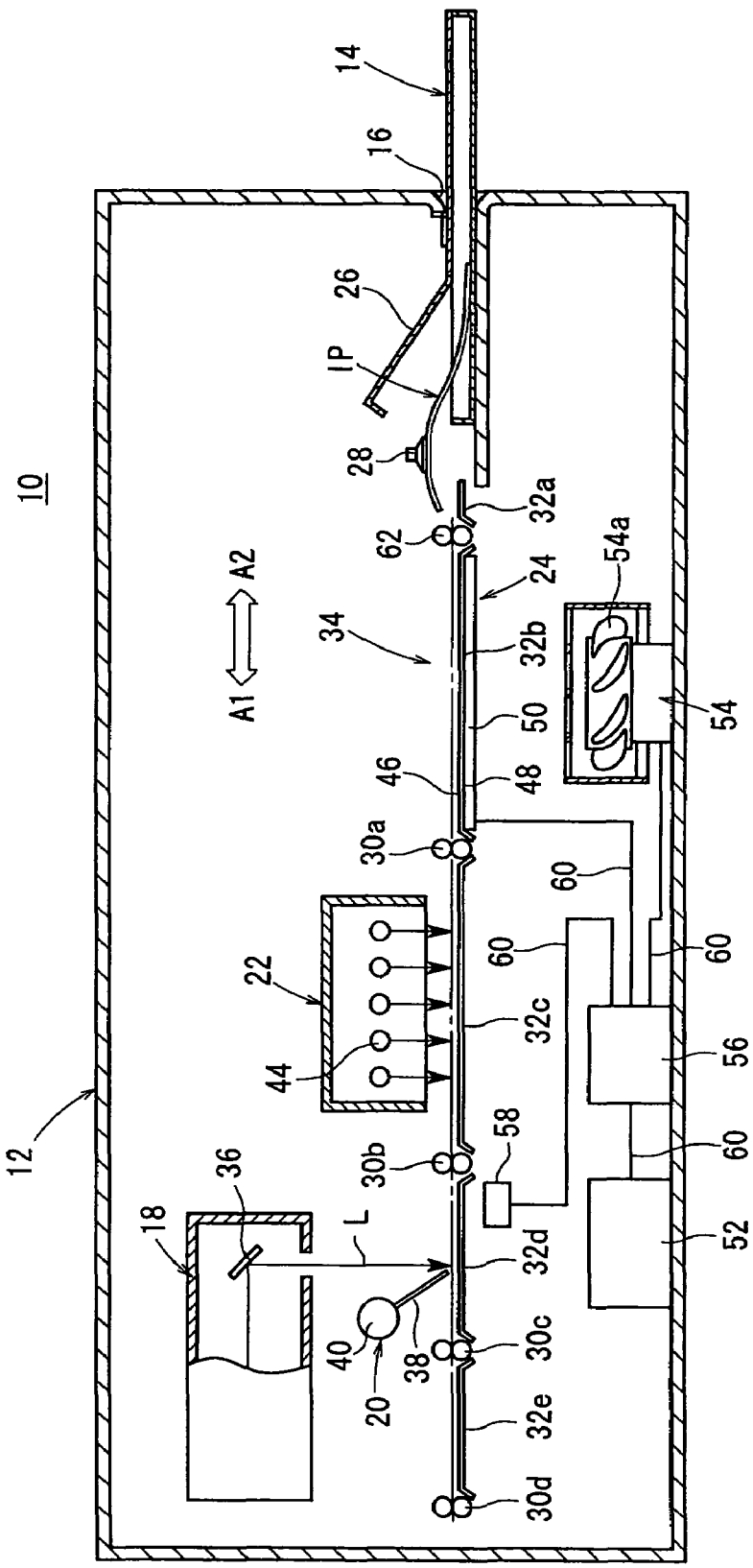
FIG. 1 is a schematic vertical cross-sectional view of an image reading apparatus according to an embodiment of the present invention.
Figure 2:
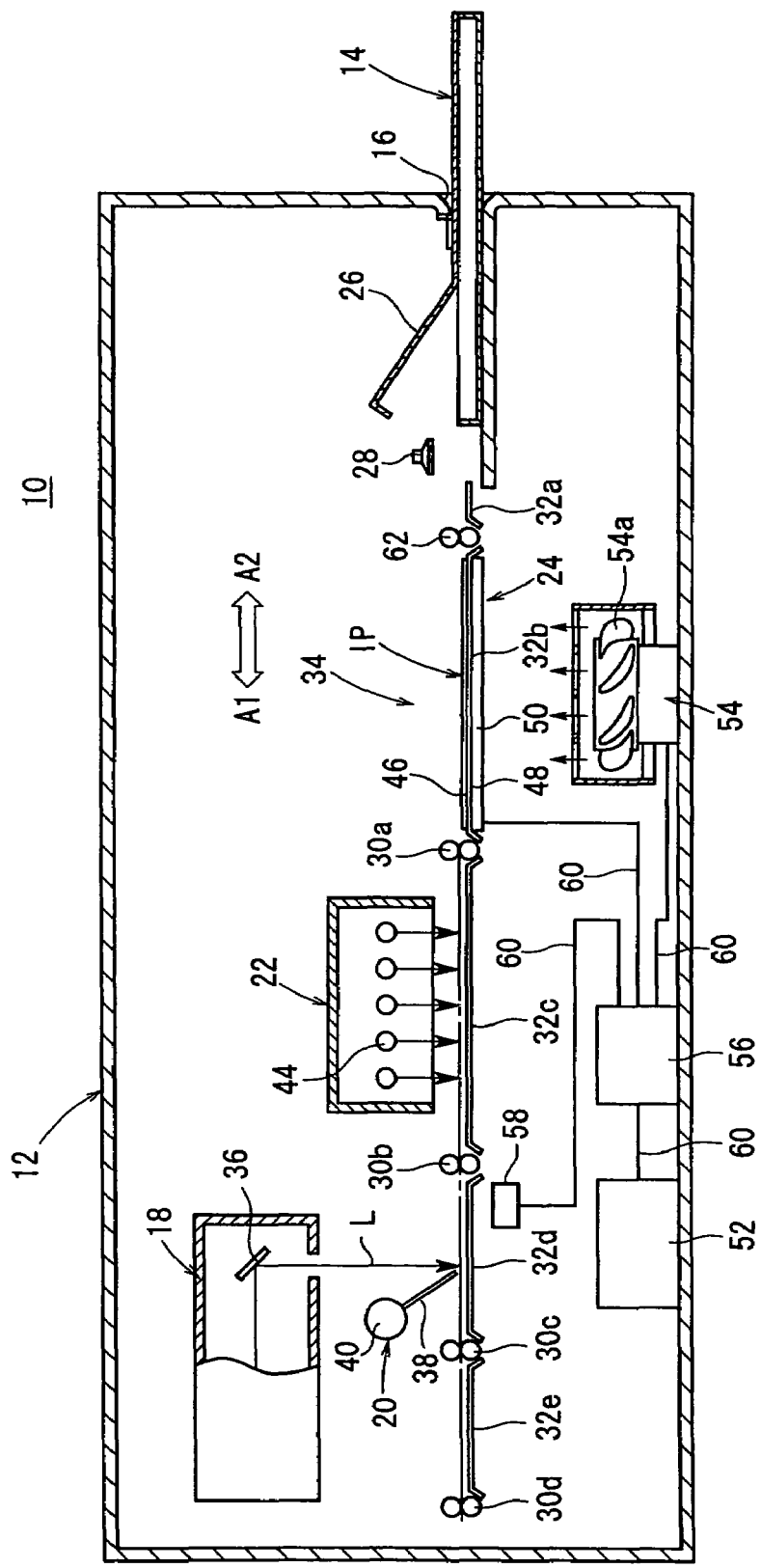
FIG. 2 is a schematic vertical cross-sectional view showing the manner in which a stimulable phosphor sheet is fed in the image reading apparatus illustrated in FIG. 1 while facing a heating body of a heating mechanism in the image reading apparatus.

FIGS. 1 and 2 show in schematic vertical cross section an image reading apparatus 10 according to an embodiment of the present invention.

As shown in FIGS. 1 and 2, the image reading apparatus 10 has a casing 12, a cassette loader 16 disposed on an end of the casing 12 for loading therein a cassette 14, which holds a stimulable phosphor sheet IP having recorded thereon radiation image information of a subject such as a human body, a scanning unit 18 disposed in the casing 12 for applying a laser beam L as stimulating light to the stimulable phosphor sheet IP with the radiation image information recorded thereon, a reading unit (reading mechanism) 20 disposed in the casing 12 for optically reading light that is emitted from the stimulable phosphor sheet IP upon exposure to the laser beam L, an erasing unit 22 disposed in the casing 12 for erasing remaining radiation image information from the stimulable phosphor sheet IP after the emitted light is read from the stimulable phosphor sheet IP, and a heating mechanism 24 disposed in the casing 12 for heating the interior of the casing 12.

The casing 12 also houses therein a suction cup 28 for attracting and removing the stimulable phosphor sheet IP from the cassette 14 when a lid 26 thereof is open, and a feed mechanism (auxiliary scanning feed mechanism) 34 having a plurality of feed rollers 30a through 30d for gripping and feeding the stimulable phosphor sheet IP removed from the cassette 14 by the suction cup 28, and a plurality of guide plates (guide members) 32a through 32d for guiding the stimulable phosphor sheet IP as it is fed by the feed rollers 30a through 30d. The feed mechanism 34 feeds the stimulable phosphor sheet IP supplied from the cassette 14 along the guide plates 32a through 32d, each comprising a thin metal panel, to a desired location inside the casing 12.

The scanning unit 18 has a laser oscillator (not shown) for emitting the laser beam L and a reflecting mirror 36 for reflecting the laser beam L from the laser oscillator toward the stimulable phosphor sheet IP that is positioned below the scanning unit 18. The laser beam L emitted from the scanning unit 18 is applied to the stimulable phosphor sheet IP between the feed rollers 30b, 30c of the feed mechanism 34. The scanning unit 18 is also combined with a focusing optical system (not shown) for focusing the laser beam L onto the stimulable phosphor sheet IP.

The reading unit 20 is disposed closely to the scanning unit 18. The reading unit 20 comprises a light guide 38 having an end disposed near the stimulable phosphor sheet IP between the feed rollers 30b, 30c and a photomultiplier 40 connected to the other end of the light guide 38 for converting the light emitted from the stimulable phosphor sheet IP into an electric signal.

The erasing unit 22 is disposed between the scanning unit 18 and the cassette loader 16 and faces the guide plate 32c. The erasing unit 22 has a plurality of erasing light sources 44, each comprising a halogen lamp or the like, placed in an erasing unit housing.

Figure 3:
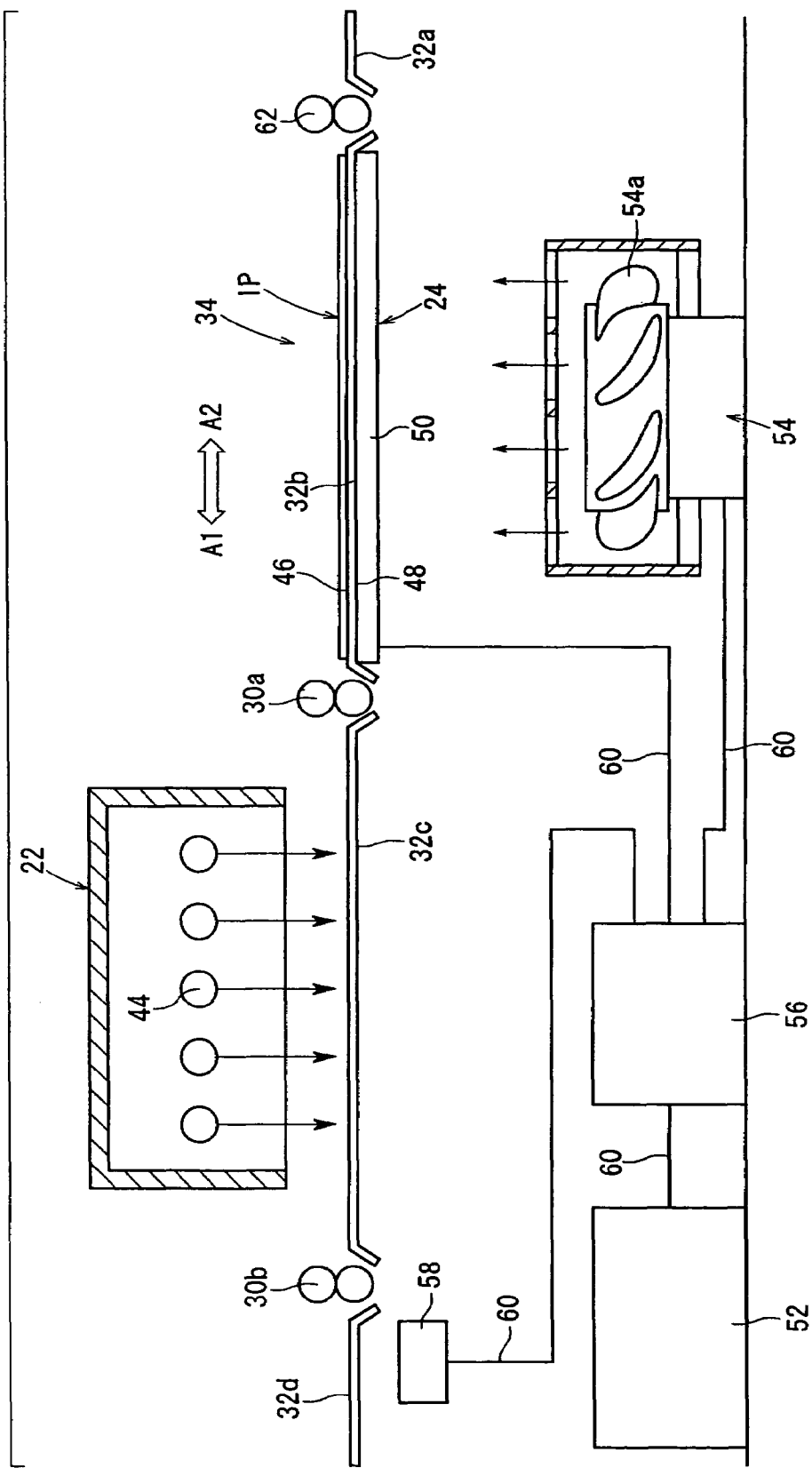
FIG. 3 is an enlarged fragmentary vertical cross-sectional view of the heating mechanism and nearby parts thereof shown in FIG. 2.

As shown in FIG. 3, the heating mechanism 24 is mounted on a lower surface 48 of the guide plate 32b, which is opposite to an upper guide surface 46 of the guide plate 32b for guiding the stimulable phosphor sheet IP thereon. The heating mechanism 24 comprises a planar heating body 50, which is heated to a predetermined temperature by an electric current supplied thereto, a power supply 52 disposed in the casing 12 (see FIGS. 1 and 2) for supplying an electric signal to the heating body 50, an air blower (air blowing mechanism) 54 for circulating air in the casing 12, a controller 56 disposed between the heating body 50 and the air blower 54 on one side thereof and the power supply 52 on the other side thereof (see also FIG. 4), for controlling electric currents supplied from the power supply 52 to the heating body 50 and the air blower 54, and a temperature detector 58 for detecting an atmospheric temperature T1 inside the casing 12.

The heating body 50 comprises, for example, a film heater having a heating circuit formed on a sheet-like film of synthetic resin. The heating body 50 is heated to a predetermined temperature when a terminal (not shown) thereof is supplied with an electric current from the power supply 52 through the controller 56. Heat produced by the heating body 50 is transmitted to the guide plate 32b made of metal, which is heated to a predetermined temperature.

Figure 5:
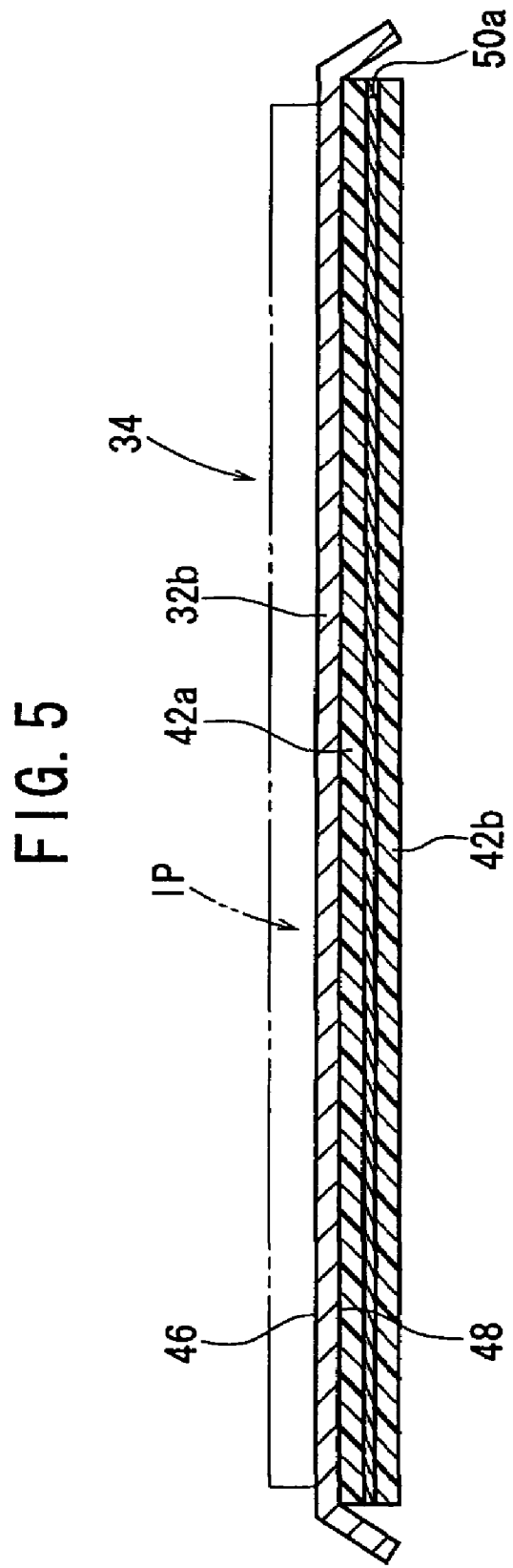
FIG. 5 is an enlarged vertical cross-sectional view of a modification of the heating body shown in FIG. 3.

FIG. 5 shows a modified heating body 50a comprising a film heater having a heating circuit formed on a sheet-like film of synthetic resin and sandwiched between sheet-like insulators 42a, 42b, each made of an insulating material, thereby forming a silicon rubber heater, for example. The modified heating body 50a has outer and inner surfaces covered respectively with the insulators 42a, 42b for providing protection against direct exposure to the surrounding space.

The heating body 50, 50a is not limited to being integrally combined with the guide plate 32b, but may be combined with either of the guide plates 32a or 32c, which are positioned closer to the cassette loader 16 (in the direction indicated by the arrow A2) than the guide plate 32d that is positioned in facing relation to the scanning unit 18 and the reading unit 20, as shown in FIGS. 1 and 2.

The air blower 54 is disposed to confront the heating body 50 in the casing 12 and is electrically connected to the controller 56 by a lead 60. The air blower 54 has a fan 54a comprising a plurality of blades. When an electric current is supplied from the power supply 52 through the controller 56 to the air blower 54, the fan 54a of the air blower 54 is rotated to circulate air inside the casing 12. The air blower 54 may alternatively be mounted in a mounting hole (not shown) defined in a wall panel of the casing 12 and held in communication with the exterior of the casing 12. When the air blower 54 is mounted in such a mounting hole, the air blower 54 allows air to be circulated inside the casing 12 even if no installation space for the air blower is available within the casing 12 due to demands for reducing the size of the image reading apparatus 10.

Figure 4:
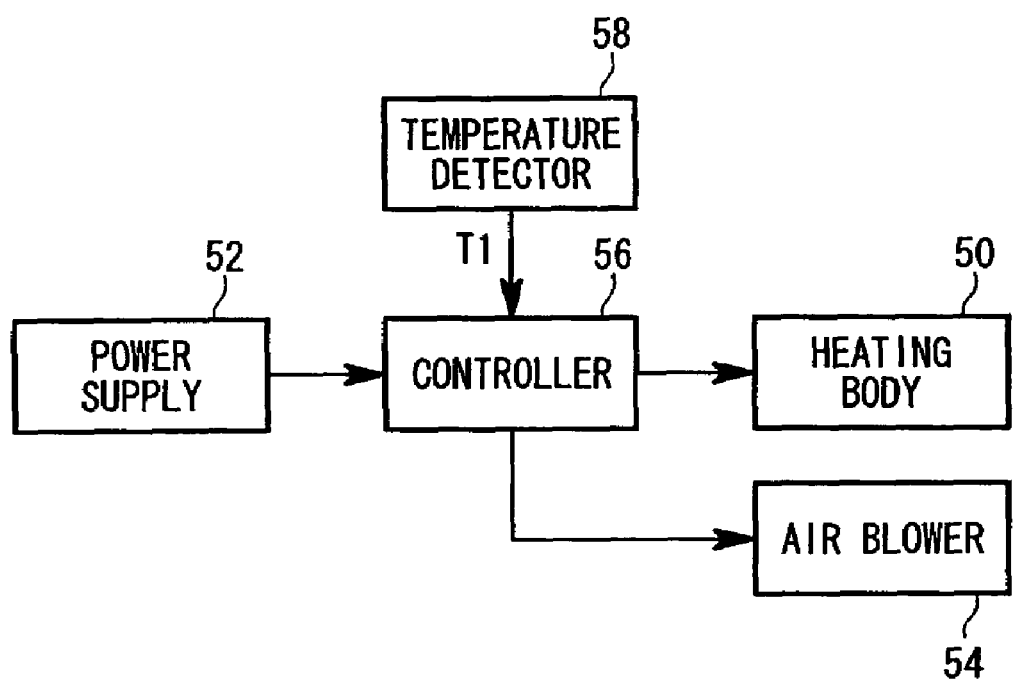
FIG. 4 is a block diagram of a system for supplying current to the heating mechanism shown in FIG. 1.

The temperature detector 58 is located in the vicinity of the reading unit 20, for example, and comprises a temperature sensor such as a thermistor, a temperature-sensitive resistor, or the like. The temperature detector 58 is electrically connected to the controller 56 by a lead 60. As shown in FIG. 4, the atmospheric temperature T1 inside the casing 12 near the reading unit 20 is detected by the temperature detector 58, which outputs a detection signal to the controller 56. Based on the atmospheric temperature T1 detected by the temperature detector 58, the controller 56 supplies an electric current from the power supply 52 to the heating body 50 to heat the heating body 50 to a predetermined temperature.

The controller 56 stores a preset reference temperature T2 in the range from 20 to 30° C., for example, for use as a reference during heating of the heating body 50. If the atmospheric temperature T1 inside the casing 12 detected by the temperature detector 58 is lower than the reference temperature T2 (T1<T2), then the controller 56 supplies electric currents through the respective leads 60 to the heating body 50 and the air blower 54. Conversely, if the atmospheric temperature T1 is higher than the reference temperature T2 (T1>T2), then the controller 56 halts the supply of electric currents through the respective leads 60 to the heating body 50 and the air blower 54.

The controller 56 automatically halts the supply of electric current from the power supply to the air blower 54 when radiation image information recorded on the stimulable phosphor sheet IP is read by the reading unit 20. Specifically, when the stimulable phosphor sheet IP is fed to the scanning unit 18 and the reading unit 20 in an auxiliary scanning direction indicated by the arrow A1, the position of the stimulable phosphor sheet IP is detected by a position detector (not shown), which outputs a detection signal to the controller 56. Based on the detected position of the stimulable phosphor sheet IP, the controller 56 halts the supply of electric current to the air blower 54.

When the air blower 54 is de-energized as described above, air heated by the heating body 50 is prevented from flowing toward the light guide 38 of the reading unit 20 while the radiation image information recorded on the stimulable phosphor sheet IP is being read by the reading unit 20. Therefore, air that is present between the reading unit 20 and the stimulable phosphor sheet IP is prevented from being unduly heated and hence from fluctuating. As a result, the radiation image information read from the stimulable phosphor sheet IP is prevented from suffering image irregularities, which would otherwise tend to occur due to air fluctuations between the reading unit 20 and the stimulable phosphor sheet IP.

At the same time, vibration and noise from the air blower 54 are not produced when it is de-energized and while the radiation image information recorded on the stimulable phosphor sheet IP is read by the reading unit 20. Therefore, the radiation image information can be read highly accurately from the stimulable phosphor sheet IP.

The image reading apparatus 10 according to the present embodiment is basically constructed as described above. Operations and advantages of the image reading apparatus 10 will be described below.

An operator, such as a radiation technician or the like, turns on the power supply (not shown) of the image reading apparatus 10. The temperature detector 58 automatically detects the atmospheric temperature T1 inside the casing 12. The temperature detector 58 outputs a detection signal, representing the detected atmospheric temperature T1, to the controller 56, which compares the detected atmospheric temperature T1 with the preset reference temperature T2.

If the atmospheric temperature T1 in the casing 12 is lower than the reference temperature (T1<T2), then the controller 56 supplies electric current from the power supply 52 to the heating body 50 of the heating mechanism 24 and to the air blower 54. The heating body 50 is heated, thereby heating the guide plate 32b, on which the heating body 50 is mounted, to a predetermined temperature. In addition, the air blower 54, which is disposed in confronting relation to the heating body 50, circulates air, which has been heated by the heating body 50, inside the casing 12. Therefore, the atmospheric temperature T1 inside the casing 12 is gradually increased.

After the guide plate 32b of the feed mechanism 34 has been heated to the predetermined temperature, the cassette 14 is loaded into the cassette loader 16 in the end of the casing 12. The cassette 14 stores therein a stimulable phosphor sheet IP on which radiation image information of a subject (not shown) is recorded. After the cassette 14 is loaded, the lid 26 of the cassette 14 is opened by a lid opening/closing mechanism (not shown) inside the casing 12.

Then, the suction cup 28 moves into the cassette 14, attracts the stimulable phosphor sheet IP in the cassette 14, and moves the stimulable phosphor sheet IP out of the cassette 14, to supply the stimulable phosphor sheet IP to nip rollers 62. The nip rollers 62 then supply the stimulable phosphor sheet IP to the feed mechanism 34. The feed rollers 30a through 30d of the feed mechanism 34 are rotated to feed the stimulable phosphor sheet IP along the guide plates 32a through 32e in the first auxiliary scanning direction indicated by the arrow A1.

As shown in FIG. 2, when the stimulable phosphor sheet IP is displaced along the guide surface 46 of the guide plate 32b by the nip rollers 62, the stimulable phosphor sheet IP is heated by contact with the guide plate 32b because the guide plate 32b has been heated to the predetermined temperature by the heating body 50.

Air around the heating body 50 is also heated by the heating body 50 and also agitated by the air blower 54, gradually increasing the atmospheric temperature T1 inside the casing 12.

The stimulable phosphor sheet IP, which is heated to a predetermined temperature by the heating body 50, is further fed in the auxiliary scanning direction indicated by the arrow A1. The stimulable phosphor sheet IP is fed until its leading end is gripped by the feed rollers 30b, at which time the position of the stimulable phosphor sheet IP is detected by the non-illustrated position detector, which outputs a detection signal to the controller 56. Based on the detected position of the stimulable phosphor sheet IP, the controller 56 stops supplying electric current to the air blower 54.

After the air blower 54 has been de-energized, the stimulable phosphor sheet IP is fed in the first auxiliary scanning direction by the feed rollers 30b to the position facing the scanning unit 18 and the reading unit 20. When the stimulable phosphor sheet IP reaches the position facing the scanning unit 18 and the reading unit 20, the scanning unit 18 applies the laser beam L as stimulating light to the stimulable phosphor sheet IP, while the laser beam L is deflected in a main scanning direction perpendicular to the first auxiliary scanning direction. Specifically, the laser beam L emitted from the laser oscillator is reflected onto the stimulable phosphor sheet IP by the reflecting mirror 36.

When irradiated with the laser beam L, the stimulable phosphor sheet IP emits light depending on the recorded radiation image information. The emitted light is guided by the light guide 38, which is positioned closely to the stimulable phosphor sheet IP and extends along the main scanning direction, to the photomultiplier 40 of the reading unit 20.

After the stimulable phosphor sheet IP, from which the recorded radiation image information has been read, is fed to the feed rollers 30d, the stimulable phosphor sheet IP is fed back in the second auxiliary scanning direction indicated by the arrow A2 by the feed mechanism 34. While the stimulable phosphor sheet IP is being fed along the erasing unit 22 disposed between the feed rollers 30a and the feed rollers 30b, erasing light sources 44 of the erasing unit 22 are energized to apply erasing light to the stimulable phosphor sheet IP, thereby erasing any remaining radiation energy from the stimulable phosphor sheet IP. Thereafter, the stimulable phosphor sheet IP is fed toward the cassette 14 and then stored back into the cassette 14.

After the recorded radiation image information has been read from the stimulable phosphor sheet IP by the reading unit 20, the controller 56 supplies electric current again from the power supply 52 to the air blower 54, and the air blower 54 is energized to circulate and agitate the air inside the casing 12.

After the stimulable phosphor sheet IP, from which the recorded radiation image information has been read and any remaining radiation energy therein has been erased, is placed in the cassette 14, the lid 26 is closed, and the cassette 14 is unloaded from the cassette loader 16.

If the atmospheric temperature T1 inside the casing 12, which is detected by the temperature detector 58, becomes substantially equal to or slightly higher than the reference temperature T2 (T1≈T2 or T1>T2), then the controller 56 stops supplying electric current from the power supply 52 to the heating body 50 based on the detection signal from the temperature detector 58. The heating body 50 is thus de-energized, allowing the atmospheric temperature T1 inside the casing 12 to drop to a desired temperature, e.g., the reference temperature T2. At this time, the controller 56 may continue to supply electric current from the power supply 52 to the air blower 54, or alternatively may also halt the supply of electric current from the power supply 52 to the air blower 54.

While the image reading apparatus 10 is being switched on, the temperature detector 58 monitors the atmospheric temperature T1 inside the casing 12 at all times. The controller 56 compares the atmospheric temperature T1 and the reference temperature T2 with each other based on the detection signal supplied from the temperature detector 58 to the controller 56, and selectively supplies electric current from the power supply 52 to the heating body 50 based on the comparison result. If the atmospheric temperature T1 inside the casing 12 is lower than the reference temperature T2 (T1<T2), then the controller 56 supplies electric current to the heating body 50, so as to heat the heating body 50 until the atmospheric temperature T1 becomes substantially equal to the reference temperature T2.

According to the present embodiment, as described above, the heating mechanism 24 for heating the interior of the casing 12 of the image reading apparatus 10 is disposed inside the casing 12. The heating body 50 of the heating mechanism 24 is mounted on the guide plate 32b, which serves for guiding the stimulable phosphor sheet IP as it is fed in the first and second auxiliary scanning directions. When electric current is supplied to the heating body 50, the heating body 50 is heated and heats the air inside the casing 12, to increase the atmospheric temperature T1 in the casing 12 up to a predetermined temperature. At this time, the air blower 54 disposed in confronting relation to the heating body 50 is energized to circulate air inside the casing 12, so that the atmospheric temperature T1 inside the casing 12 becomes uniform.

When the image reading apparatus 10 is used in low temperature environments during winter and in cold climates, moisture condensation may occur in the image reading apparatus 10 due to a temperature difference that is abruptly caused between the temperature in the room in which the image reading apparatus 10 is installed and the atmospheric temperature T1 inside the image reading apparatus 10. To avoid this problem, according to the present invention, the space inside the casing 12 is heated in advance to a predetermined temperature by the heating body 50, to prevent moisture condensation from occurring inside the casing 12, even when the room in which the image reading apparatus 10 is installed is quickly heated by a heater or the like to increase the temperature in the room.

Therefore, it is unnecessary to install a dehumidifier or the like for removing moisture condensation from inside the image reading apparatus 10. Thus, the image reading apparatus 10 can be reduced in size, and the installation space for installing the image reading apparatus 10 can similarly be reduced.

The heating body 50 is disposed along the guide plate 32b on which the stimulable phosphor sheet IP is fed, so that the guide plate 32b, which comprises a thin metal panel, is heated to a predetermined temperature by the heating body 50. Consequently, when the stimulable phosphor sheet IP is fed in the first and second auxiliary scanning directions along the guide plate 32b, the stimulable phosphor sheet IP is heated by contact with the guide plate 32b. The stimulable phosphor sheet IP is thus prevented from becoming curled at its leading end due to low temperatures. The stimulable phosphor sheet IP can reliably be gripped by the feed rollers 30a through 30d, and smoothly and reliably be fed in the first and second auxiliary scanning directions indicated by the arrows A1, A2.

The casing 12 accommodates therein the temperature detector 58 for detecting the atmospheric temperature T1 inside the casing 12. The controller 56 supplies an electric current to the heating body 50 to heat the heating body 50, until the atmospheric temperature T1 detected by the temperature detector 58 becomes substantially equal to the reference temperature T2 preset in the controller 56 (T1≈T2). If the atmospheric temperature T1 becomes higher than the reference temperature T2 (T1>T2), then the controller 56 halts the supply of electric current to the heating body 50, to suspend heating of the heating body 50. Since the atmospheric temperature T1 is kept substantially constant (T1≈T2) inside the image reading apparatus 10, the stimulable phosphor sheet IP can smoothly be fed in the casing 12 without being affected by the temperature outside of the casing 12.

When the reading unit 20 reads the radiation image information recorded on the stimulable phosphor sheet IP, the controller 56 stops supplying electric current to the air blower 54 to de-energize the air blower 54. Therefore, while the recorded radiation image information is being read from the stimulable phosphor sheet IP, air heated by the heating body 50 is prevented from flowing toward the light guide 38 of the reading unit 20, and hence the air around the reading unit 20 is prevented from fluctuating. As a consequence, radiation image information read from the stimulable phosphor sheet IP is prevented from suffering image irregularities.

In the above embodiment, the heating body 50 of the heating mechanism 24 is integrally combined with the guide plate 32b, for directly heating the guide plate 32b. However, according to a modified structure, each of the feed rollers 30a, 30b and/or the nip rollers 62, which are positioned closer to the cassette loader 16 than the scanning unit 18 and the reading unit 20, may incorporate therein a sheet-like heating body 50b (see FIG. 6) such as a film heater or the like, and insulators 42a, 42b made of an insulating material such as silicone rubber, for example, may be provided, which cover respective outer and inner circumferential surfaces of the heating body 50b. According to another modification, each of the feed rollers 30a, 30b and/or the nip rollers 62 may incorporate therein a Nichrome wire, rather than a film heater.

Figure 6:
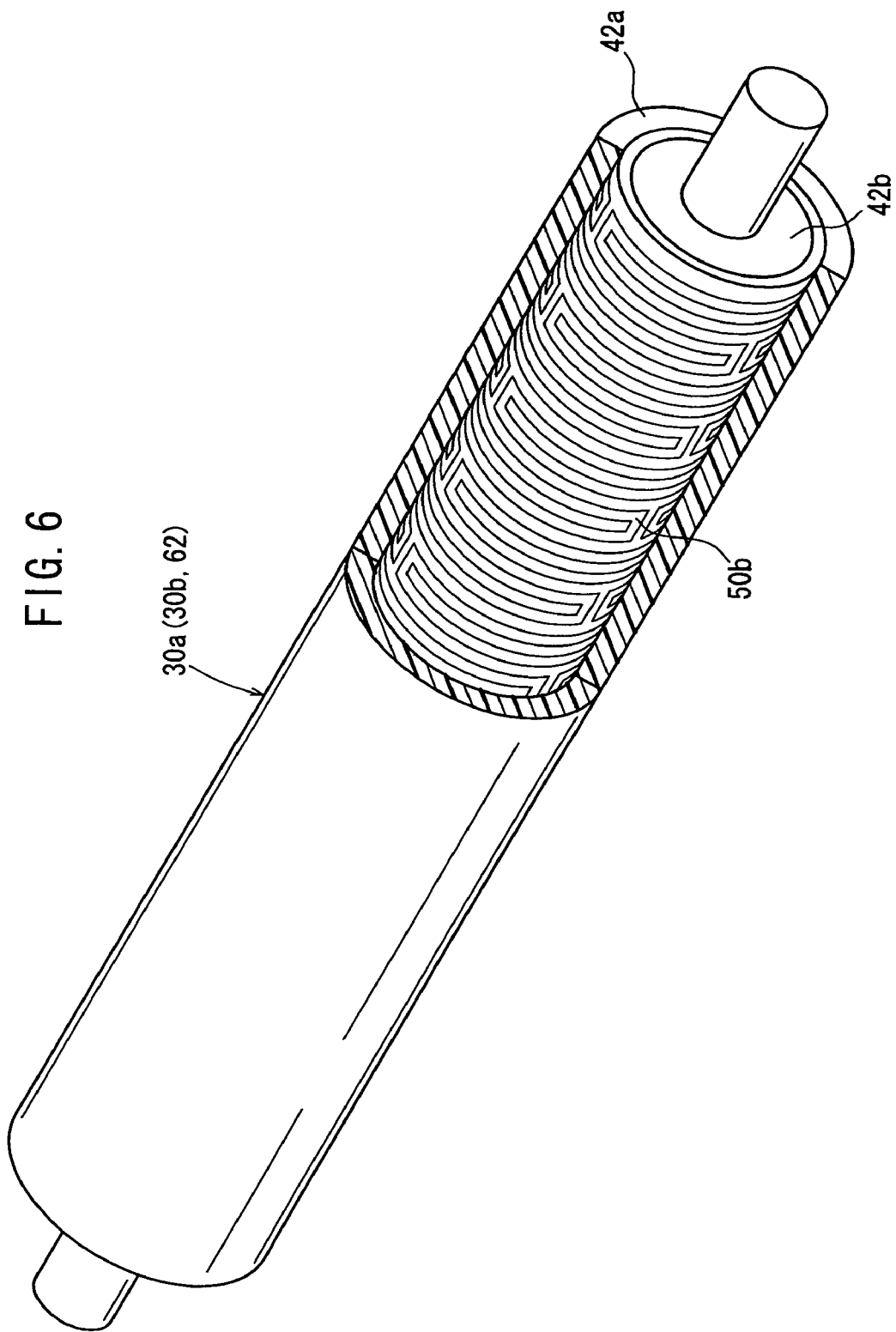
FIG. 6 is a perspective view, partly cut away, of a modified feed roller of a feed mechanism of the image reading apparatus shown in FIG. 1, the feed roller incorporating a heating body therein.
Figure 7:
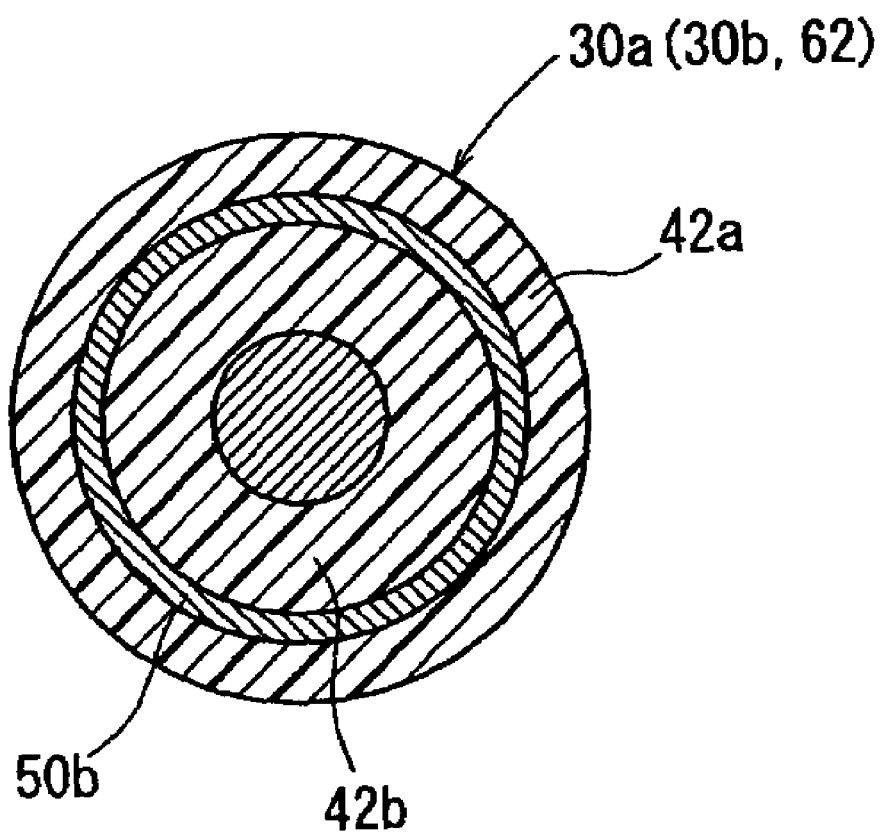
FIG. 7 is a transverse cross-sectional view of the feed roller shown in FIG. 6.

According to the modification shown in FIG. 6, when the stimulable phosphor sheet IP is fed in the auxiliary scanning directions indicated by arrows A1 and A2, by the feed rollers 30a through 30d and/or the nip rollers 62 of the feed mechanism 34, both upper and lower surfaces of the stimulable phosphor sheet IP can be heated by the heaters 50b, which are heated by an electric current supplied thereto, while the stimulable phosphor sheet IP is held in contact with the feed rollers 30a through 30d and/or the nip rollers 62. Consequently, the stimulable phosphor sheet IP can be heated more efficiently as the stimulable phosphor sheet IP is being fed, as a result of being held in contact with the feed rollers 30a through 30d and/or the nip rollers 62.

Although certain preferred embodiments of the present invention have been shown and described in detail, it should be understood that various changes and modifications may be made therein without departing from the scope of the invention, as set forth in the appended claims.

What is claimed is:

1. An image reading apparatus for reading radiation image information of a subject recorded on a stimulable phosphor sheet, comprising:

a casing;

a reading mechanism disposed in said casing for applying stimulating light deflected in a main scanning direction to the stimulable phosphor sheet to read the radiation image information therefrom;

an auxiliary scanning feed mechanism disposed in said casing for feeding the stimulable phosphor sheet in an auxiliary scanning direction, which is substantially perpendicular to said main scanning direction; and a heating mechanism disposed in said casing for heating the interior of said casing;

an air blowing mechanism disposed in said casing for circulating air in said casing; and a controller for switching a supply state of electric current based on a temperature inside said casing that is detected by a temperature detector, said air blowing mechanism comprising an air blower connected to said controller, said controller selectively supplying an electric current to said air blower, wherein said controller stops supplying electric current to said air blower when the radiation image information is read from the stimulable phosphor sheet by said reading mechanism.

2. The image reading apparatus according to claim 1, wherein said heating mechanism comprises:

a heating body energized by an electric current supplied thereto for generating heat;

a temperature detector for detecting the temperature of the interior of said casing; and a controller for selectively supplying the electric current to said heating body based on the temperature detected by said temperature detector.

3. The image reading apparatus according to claim 2, wherein said heating body comprises a film heater having a heating circuit formed on a sheet-like film of synthetic resin.

4. The image reading apparatus according to claim 2, wherein said auxiliary scanning feed mechanism comprises:

a plurality of guide members for guiding the stimulable phosphor sheet in said auxiliary scanning direction; and a plurality of feed rollers for gripping and feeding the stimulable phosphor sheet along said guide members, wherein said heating body is combined with at least one of each of said guide members and each of said feed rollers.

5. The image reading apparatus according to claim 4, wherein each of said guide members has a guide surface for guiding the stimulable phosphor sheet thereon, and said heating body is mounted on a surface of each of said guide members that is opposite to said guide surface.

6. The image reading apparatus according to claim 5, wherein said heating body is sandwiched between a pair of insulators each made of an insulating material.

7. The image reading apparatus according to claim 4, wherein said heating body is disposed in each of said feed rollers and has outer and inner surfaces covered with respective insulators each made of an insulating material.

8. The image reading apparatus according to claim 1, wherein said air blowing mechanism comprises an air blower having a rotatable fan comprising a plurality of blades.

9. The image reading apparatus according to claim 2, wherein said controller stops supplying electric current to said heating body if the temperature in said casing, which is detected by said temperature detector, is higher than a preset temperature.

10. The image reading apparatus of claim 1, said heating mechanism heating said phosphor sheet is disposed in said casing.

11. The image reading apparatus of claim 1, wherein the auxiliary scanning feed mechanism operably conveys the sheet in a first auxiliary direction and a second auxiliary direction.

12. The image reading apparatus of claim 1, wherein the reading mechanism reads the image information during conveyance in the first auxiliary direction, and the apparatus further comprises an erasing device which operates when the sheet is conveyed in the second auxiliary direction.

13. The image reading apparatus of claim 1 wherein the stimulating light is a laser source.

14. The image reading apparatus of claim 1, wherein the operation of the controller provides uniform heating within the casing.

* * * * *